Sept. 8, 1931.    B. F. SHEPHERD    1,822,115
CHUCK FOR ROCK DRILLS
Filed Aug. 5, 1929
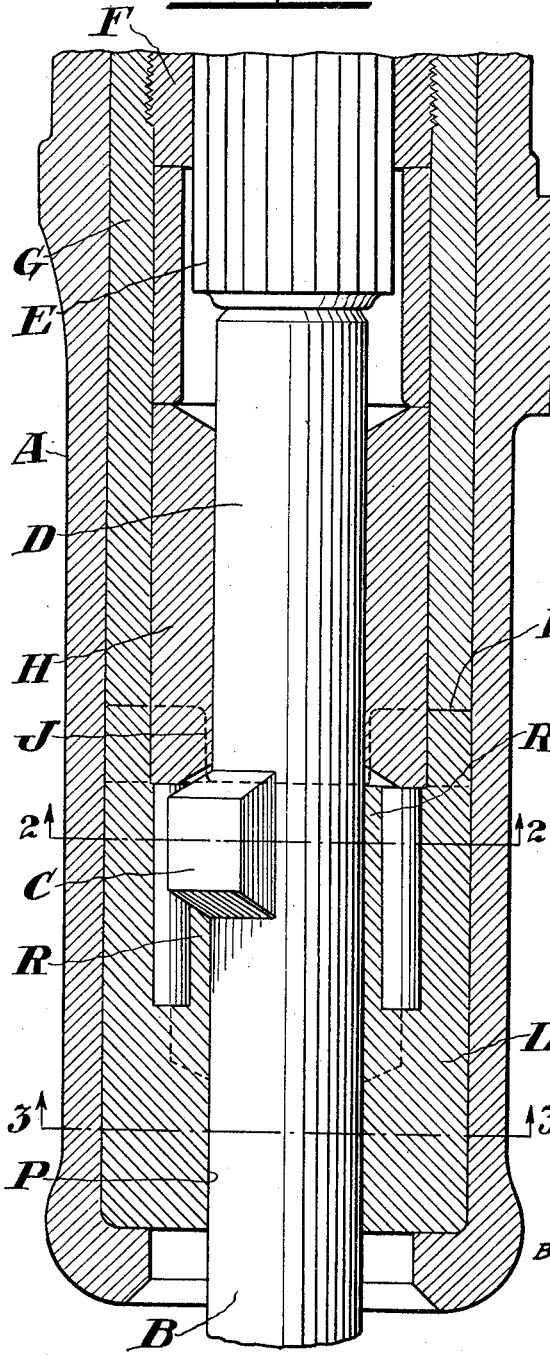
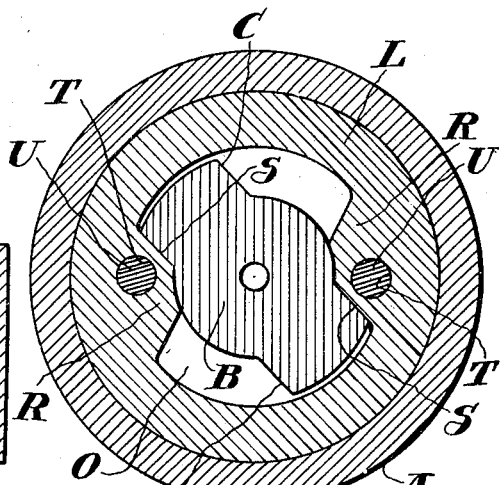
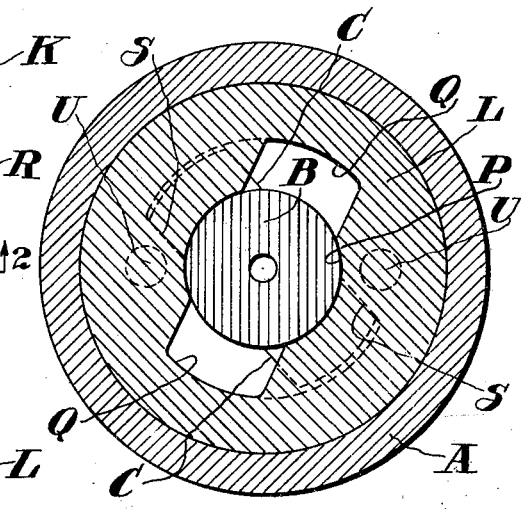
INVENTOR.
BENJAMIN FRANKLIN SHEPHERD.
BY
HIS ATTORNEY.

Patented Sept. 8, 1931

1,822,115

UNITED STATES PATENT OFFICE

BENJAMIN FRANKLIN SHEPHERD, OF PHILLIPSBURG, NEW JERSEY, ASSIGNOR TO INGERSOLL-RAND COMPANY, OF JERSEY CITY, NEW JERSEY, A CORPORATION OF NEW JERSEY

CHUCK FOR ROCK DRILLS

Application filed August 5, 1929. Serial No. 383,702.

This invention relates to rock drills, but more particularly to chuck mechanism for fluid actuated rock drills of the type in which the piston reciprocates independently of the working implement for driving the working implement into the work.

One object of the invention is to prolong the period of usefulness of the chuck mechanism.

Other objects will be in part obvious and in part pointed out hereinafter.

In the drawings accompanying the specification and in which similar reference characters refer to similar parts, Figure 1 is a sectional elevation of the front end of a rock drill showing a chuck mechanism constructed in accordance with the practice of the invention, and Figures 2 and 3 are transverse views taken through Figure 1 on the lines 2—2 and 3—3 looking in the direction indicated by the arrows.

Referring more particularly to the drawings, the invention is shown embodied in a rock drill having a front head A into which extends a working implement B, such as a drill steel. The working implement B illustrated is of the type commonly referred to as a Leyner steel and accordingly has a pair of lateral lugs C disposed on diametrically opposite sides thereof. The portion D of the working implement rearwardly of the lugs C serves as a shank and extends into the front head A to receive the blows of a hammer piston, only the forward fluted extension E of which is shown.

The rock drill may be provided with suitable rotation mechanism, such as a rifle bar (not shown) for imparting rotary movement to the working implement, and the piston extension E may interlock slidably in a well known manner with a chuck nut F threaded into the rearward end of a chuck G adapted to rotate in the front head A and serving as a bearing for a chuck bushing H into which extends the shank D of the working implement.

The chuck G is provided at its front end with clutch members J of a known type to interlockingly engage clutch members K carried by a chuck driver L in the front end of the front head A and having a cavity O to receive the lugs C of the working implement.

In the forward end of the chuck driver L is a bore P to act as a guide for the body portion of the working implement forwardly of the lugs C, and on opposite sides of the bore P are slots Q through which the lugs C may pass when inserting the working implement into and removing it from the front head A.

In accordance with a well known practice the chuck driver L is provided with introverted ribs R which extend into the cavity O and are so disposed with respect to the slots Q that after the lugs C are passed through the slots Q the working implement may be rotated a partial revolution to carry the lugs C into contact with the ribs R. By thus arranging the ribs relatively to the slots Q, the front wall of the cavity O will also serve to retain the working implement within the front head.

Preferably the ribs are somewhat longer than the lugs C so that the working implement B will be capable of a limited degree of reciprocation within the elements acting as a guide therefor. Due to this action of the working implement, however, the hardened surfaces S of the ribs R against which the lugs C bear are subjected to severe wear caused by the abrading action of the lugs C against these surfaces.

Although it has been proposed heretofore to completely harden the chuck driver to enable it to withstand the wearing action of the lugs of the working implement, it has been found that when thus treated other undesirable conditions are present and the preferred practice therefor is to case-harden the chuck driver, thus leaving a comparatively soft interior capable of withstanding the strains imposed upon the chuck driver by the rotation mechanism.

The present invention contemplates equipping the chuck driver with means whereby after the case hardened surfaces S are worn through, the lugs C of the working implement may continue to bear against elements of at least the same degree of hardness as the case hardened surfaces S so that the chuck driver may continue rendering useful service for an extended period of time after the hardened surfaces S have been worn away. To this end the chuck driver L is provided with apertures T in each rib R and preferably adjacent the case hardened surfaces S but entirely within the soft interior of the ribs. Within the apertures T are disposed pins U which may be press fitted into the apertures T and may be formed of metal possessing inherent hardness or may be suitably hardened to resist the wearing action of the lugs C.

In practice, when the drill is first placed in service, the lugs C, of course, bear only against the hardened surfaces S. After some usage, however, the hardened surfaces become worn through by the lugs which may thereafter bear directly against the hardened pins U instead of against the soft interior of the ribs as heretofore. A drill thus equipped will therefore be capable of being operated for longer periods of uninterrupted drilling than may those where the ribs are only provided with a comparatively thin wear resisting surface.

I claim:

1. In a rock drill, the combination of a front head and a drill steel extending into the front head, lugs on the drill steel, a chuck rotatable in the front head and having a cavity to receive the lugs, ribs in the chuck extending into the cavity and having hardened wear resisting surfaces overlying relatively soft interior portions to engage the lugs, and additional wear resisting means inserted in the soft interior portion of the ribs beneath the engaging surfaces and adapted to prevent undue wear of the relatively soft interior portions of the ribs by contacting with the lugs on the drill steel after the hardened surfaces are worn through.

2. In a rock drill, the combination of a front head and a drill steel extending into the front head, lugs on the drill steel, a chuck rotatable in the front head and having a cavity to receive the lugs, ribs in the chuck extending into the cavity and having hardened wear resisting surfaces overlying relatively soft interior portions to engage the lugs, and hardened pins inserted in the soft interior portion of the ribs adjacent the hardened surfaces and beneath the initial engaging surfaces thereof and adapted to prevent undue wear of the relatively soft interior portions of the ribs by contacting with the lugs on the drill steel after the hardened surfaces are worn through.

In testimony whereof I have signed this specification.

B. FRANKLIN SHEPHERD.